(12) United States Patent
Yoon et al.

(10) Patent No.: US 7,302,264 B2
(45) Date of Patent: Nov. 27, 2007

(54) SYSTEM AND METHOD FOR FAST NETWORK RE-ENTRY IN A BROADBAND WIRELESS ACCESS COMMUNICATION SYSTEM

(75) Inventors: Seung-Il Yoon, Seongnam-si (KR);
Tae-Ho Kim, Suwon-si (KR);
Jun-Hyuk Song, Anyang-si (KR);
Hong-Sung Chang, Suwon-si (KR);
Tae-Won Kim, Yongin-si (KR); Yong Chang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 20 days.

(21) Appl. No.: 11/149,697

(22) Filed: Jun. 10, 2005

(65) Prior Publication Data

US 2005/0277417 A1 Dec. 15, 2005

(30) Foreign Application Priority Data

Jun. 11, 2004 (KR) ...................... 10-2004-0043232
Jun. 25, 2004 (KR) ...................... 10-2004-0048568

(51) Int. Cl.
*H04Q 7/20* (2006.01)

(52) U.S. Cl. ..................................... 455/436

(58) Field of Classification Search ................ 455/436, 455/439, 445, 517, 432, 524
See application file for complete search history.

(56) References Cited

U.S. PATENT DOCUMENTS

| | | | |
|---|---|---|---|
| 2002/0028690 A1* | 3/2002 | McKenna et al. | 455/517 |
| 2004/0209615 A1* | 10/2004 | Lamb et al. | 455/433 |
| 2005/0083887 A1 | 4/2005 | Lee et al. | |
| 2005/0143071 A1* | 6/2005 | Jaakkola et al. | 455/436 |
| 2005/0197125 A1* | 9/2005 | Kang et al. | 455/436 |
| 2006/0025135 A1* | 2/2006 | Karaoguz et al. | 455/436 |

FOREIGN PATENT DOCUMENTS

| | | |
|---|---|---|
| GB | 2 332 823 | 6/1999 |
| KR | 2003-0027314 | 4/2003 |

* cited by examiner

*Primary Examiner*—Naghmeh Mehrpour
(74) *Attorney, Agent, or Firm*—The Farrell Law Firm, P.C.

(57) ABSTRACT

A system and method for fast network re-entry in a broadband wireless access communication system. A mobile station transmits a first message requiring fast network re-entry to a base station and performs the fast network re-entry together with the base station when receiving a second message approving the fast network re-entry from the base station. The base station receives the first message, authenticates the first message using final session information of the mobile station that is previously stored in the base station, transmits the second message to the mobile station when succeeding in authentication of the first message, and performs the fast network re-entry together with the mobile station.

52 Claims, 13 Drawing Sheets

| Syntax | Size | Notes |
|---|---|---|
| DREG-CMD_Message_Format() { | | |
| [,,,] | | |
| SIR_ID_INCL | 1 bit | SIR ID included indicator |
| if( SIR_ID_INCL ) | | |
| { | | |
|    SIR_ID | 32 bit | assigned SIR ID |
| } | | |

FIG.1

| Name | Type (1byte) | Length | Value |
|---|---|---|---|
| AS ID | ?.1 | 4 | Authentication and Service Authorization Server ID |
| AK | ?.2 | 16 | |
| AK life time | ?.3 | 4 | |
| HMAC Tuple | ?.4 | 21 | |
| HMAC Tuple life time | ?.5 | 4 | |

| RCS Request | ? | variable | Compound |
|---|---|---|---|

FIG.3

| Name | Type (1byte) | Length | Value |
|---|---|---|---|
| RCS Request | ? | variable | Compound |

| Name | Type (1byte) | Length | Value |
|---|---|---|---|
| Request Type | ?.1 | 1 | #Bit0 : Reduced Call Setup request<br>#Bit 1~Bit 7: reserved |
| SIR ID | ?.2 | 4 | Session Information Record ID |
| AS ID | ?.3 | 4 | Authentication and Service Authorization Server ID |

FIG.5

| Name | Type (1byte) | Length | Value |
|---|---|---|---|
| RCS Response | ? | variable | Compound |

| Name | Type (1byte) | Length | Value |
|---|---|---|---|
| Response Type | ?.1 | 1 | #Bit 0 : Reduced Call Setup totally accepted<br>#Bit 1 : Reduced Call Rejected and SS is forced to perform a normal network entry procedures<br>#Bit 2 : SS's Basic Capability(SBC) re-negotiation required<br>#Bit 3 : Privacy Key Management (PKM) re-negotiation required<br>#Bit 4 : Registration (REG) re-negotiation required<br>#Bit 5 : IP Re-allocation required<br>#Bit 6~Bit 7: reserved |
| AS ID | ?.2 | 4 | Authentication and Service Authorization Server ID |

FIG.6

| Syntax | Size | Notes |
|---|---|---|
| MOB-PAG-ADV_Message_Format() { | | |
| [...] | | |
| SIR_ID_INCL | 1 bit | SIR ID included indicator |
| if( SIR_ID_INCL ) | | |
| { | | |
| SIR_ID | 32 bit | assigned SIR ID |
| } | | |

FIG.7

| Name | Type (1byte) | Length | Value |
|---|---|---|---|
| RCS Request | ? | variable | Compound |

| Name | Type (1byte) | Length (byte) | Value |
|---|---|---|---|
| Request Type | ?.1 | 1 | For each bit location, a value of '0' indicates the associated re-entry management messages shall be required, a value of '1' indicates the re-entry management message may be omitted<br><br>#Bit 0 : Omit SBC-REQ/RSP management messages during current re-entry processing<br>#Bit 1 : Omit PKM-REQ/RSP management messages during current re-entry processing<br>#Bit 2 : Omit REG-REQ/RSP management messages during current re-entry processing<br>#Bit 3 : Omit Network Address Acquisition management messages during current re-entry processing<br>#Bit 4 : Omit Time of Day Acquisition management messages during current re-entry processing<br>#Bit 5 : Omit TFTP management messages during current re-entry processing<br>#Bit 6 ~ 7 : reserved |

FIG.11

| Name | Type (1byte) | Length | Value |
|---|---|---|---|
| RCS accepted | ? | variable | Compound |

| Name | Type (1byte) | Length | Value |
|---|---|---|---|
| Response Type | ?.1 | 1 | For each bit location, a value of '0' indicates the associated re-entry management messages shall be required, a value of '1' indicates the re-entry management message may be omitted. Regardless of settings, the BS may send unsolicited SBC-RSP and/or REG-RSP management<br><br>#Bit 0 : Omit SBC-REQ/RSP management messages during current re-entry processing<br>#Bit 1 : Omit PKM-REQ/RSP management messages during current re-entry processing<br>#Bit 2 : Omit REG-REQ/RSP management messages during current re-entry processing<br>#Bit 3 : Omit Network Address Acquisition management messages during current re-entry processing<br>#Bit 4 : Omit Time of Day Acquisition management messages during current re-entry processing<br>#Bit 5 : Omit TFTP management messages during current re-entry processing<br>#Bit 6 ~ 7 : reserved |

FIG.12

| Syntax | Size | Notes |
|---|---|---|
| MOB-PAG-ADV_Message_Format() { | | |
| [...] | | |
| RCS_INDICATOR | 1bit | 0 : reserved<br>1 : Reduced Call Setup Request |

FIG. 13

SYSTEM AND METHOD FOR FAST NETWORK RE-ENTRY IN A BROADBAND WIRELESS ACCESS COMMUNICATION SYSTEM

PRIORITY

This application claims priority under 35 U.S.C. § 119 to applications entitled "System And Method For Fast Network Re-entry In Broadband Wireless Access Communication System" filed in the Korean Industrial Property Office on Jun. 11, 2004 and assigned Serial No. 2004-43232, and on Jun. 25, 2004 and assigned Serial No. 2004-48568, the contents of which are hereby incorporated by reference.

BACKGROUND OF THE INVENTION

1. Field of the Invention

The present invention relates generally to a system and method for Broadband Wireless Access (BWA) communication, and more particularly to a system and method, by which a mobile station (MS) in an idle state performs fast network re-entry using final session information of a previous active state in a BWA communication system.

2. Description of the Related Art

In the next generation communication system, research has been actively pursued to provide users with services having various qualities of services (QoSs) and supporting a high transmission speed. More specifically, for the next generation communication system, research has been actively pursued to develop a new type of communication system ensuring mobility and QoS in a BWA communication system such as a wireless Local Area Network (LAN) system and a wireless Metropolitan Area Network (MAN) system capable of supporting relatively high transmission speeds. For example, an Institute of Electrical and Electronics Engineers (IEEE) 802.16e communication system has been developed. The IEEE 802.16e communication system is an improvement of the IEEE 802.16d communication system in that IEEE 802.16e communication system is provided with mobility in addition to the structure of the IEEE 802.16d communication system, which provides broadband Internet service to a stationary Subscriber Station (SS).

As described above, the IEEE 802.16d communication system does not provide mobility at all because it is a communication system for providing broadband Internet service to a stationary SS. However, although the IEEE 802.16e communication system handles mobility, it is still in a very poor state for supporting various service functions such as a security function.

In the IEEE 802.16e communication system, transition into an idle state is frequently performed in order to minimize power consumption of a Mobile Station (MS). Further, the IEEE 802.16e communication system supports handover of the MS and the MS must perform network re-entry or location registration when the handover is performed. In this case, call setup must be re-performed between the Base Station (BS) and the MS and session information for the active state of the MS must regenerated. That is, for handover of the MS in the idle state, the MS must either perform the location registration or perform network re-entry process in order to transit from the idle state to an active state. The location registration or the network re-entry process causes processing delay and increases message signaling load.

SUMMARY OF THE INVENTION

Accordingly, the present invention has been designed to solve the above and other problems occurring in the prior art. An object of the present invention is to provide a system and method for fast network re-entry in a BWA communication system.

It is another object of the present invention to provide a system and method by which an MS in an idle state performs fast network re-entry using final session information in a BWA communication system.

In order to accomplish the above and other objects, there is provided a method for fast network re-entry of a mobile station in a broadband wireless access communication system. The method comprises the steps of: transmitting a first message requesting fast network re-entry to a base station when the mobile station detects that it is necessary to perform network re-entry to the base station in an idle state in which the mobile station stores final session information of a previous active state; receiving a second message approving the fast network re-entry from the base station; and performing the fast network re-entry with the base station.

In accordance with another aspect of the present invention, there is provided a method for fast network re-entry of a mobile station in a broadband wireless access communication system including the mobile station, a serving base station that provides service to the mobile station, a target base station, which is different from the serving base station, and an ASA (Authentication and Service Authorization) server connected to the target base station. The method comprises the steps of storing final session information by the mobile station when transitioning into an idle state; transmitting the final session information to the target base station so that the target base station and the ASA server store the final session information, when the mobile station detects that handover from the serving base station to the target base station is necessary, after the mobile station stores the final session information; transmitting a first message requiring fast network re-entry to the target base station; receiving a second message approving the fast network re-entry from the target base station; and performing the fast network re-entry with the target base station.

In accordance with another aspect of the present invention, there is provided a method for fast network re-entry of a base station in a broadband wireless access communication system. The method comprises the steps of: receiving a first message requiring fast network re-entry from a mobile station that is in an idle state during which the mobile station stores final session information of a previous active state; authenticating the first message using final session information of the mobile station that is previously stored in the base station; transmitting a second message approving the fast network re-entry to the mobile station, after the first message is authenticated; and performing the fast network re-entry with the mobile station.

In accordance with another aspect of the present invention, there is provided a method for fast network re-entry in a broadband wireless access communication system. The method comprises the steps of: transmitting a first message requiring fast network re-entry from a mobile station to a base station, when the mobile station detects that it is necessary to perform network re-entry to the base station in an idle state during which the mobile station stores final session information of a previous active state; receiving the first message by the base station; authenticating the first message by the base station using final session information of the mobile station that is previously stored in the base station; transmitting a second message approving the fast network re-entry to the mobile station, the first message is authenticated; and performing the fast network re-entry by the mobile station and the base station.

In accordance with another aspect of the present invention, there is provided a method for fast network re-entry in a broadband wireless access communication system that includes the mobile station, a serving base station that provides service to the mobile station, a target base station, which is different from the serving base station, and an ASA (Authentication and Service Authorization) server connected to the target base station. The method comprises the steps of: transmitting final session information from the mobile station to the target base station so that the target base station and the ASA server store the final session information, when the mobile station detects that handover from the serving base station to the target base station is necessary, after the mobile station stores the final session information while transitioning into an idle state; receiving the final session information in the target base station; storing the final session information in the target base station; transmitting a first message requiring the fast network re-entry to the target base station; receiving the first message by the target base station; authenticating the first message by the target base station using final session information of the mobile station stored in advance in the target base station; transmitting a second message approving the fast network re-entry to the mobile station, after authenticating the first message; and performing the fast network re-entry by the mobile station and the target base station.

In accordance with another aspect of the present invention, there is provided a system for fast network re-entry in a broadband wireless access communication system. The system comprises a base station; and a mobile station for transmitting a first message requiring fast network re-entry to the base station when the mobile station detects that it is necessary to perform network re-entry to the base station in an idle state during which the mobile station stores final session information of a previous active state, the mobile station performing the fast network re-entry together with the base station when receiving a second message approving the fast network re-entry from the base station, wherein the base station receives the first message, authenticates the first message using final session information of the mobile station that is previously stored in the base station, transmits the second message to the mobile station, after authenticating the first message, and performs the fast network re-entry with the mobile station.

In accordance with another aspect of the present invention, there is provided a system for fast network re-entry in a broadband wireless access communication system. The system comprises a target base station; and a mobile station for storing final session information when transitioning into an idle state, transmitting the final session information to the target base station, such that the target base station and an ASA (Authentication and Service Authorization) server store the final session information, when the mobile station detects that handover from a serving base station to the target base station is necessary after the mobile station stores the final session information, transmitting a first message requiring fast network re-entry to the target base station, and performing the fast network re-entry with the target base station, when receiving a second message approving the fast network re-entry from the target base station; wherein the target base station receives and stores the final session information, authenticates the first message using final session information of the mobile station stored in advance in the target base station, transmits the second message to the mobile station, after authenticating the first message, and performs the fast network re-entry together with the mobile station.

In accordance with another aspect of the present invention, there is provided a method for fast network re-entry of a base station in a broadband wireless access communication system, the method comprising the steps of: transmitting to a mobile station in an active state a deregistration command message to request for transition into an idle state, wherein the deregistration command message includes session information for a fast network re-entry; receiving a ranging request message from the mobile station to perform the network re-entry after the mobile station transit into the active state; transmitting to the mobile station a ranging response message which includes the session information represents whether each network re-entry process among network re-entry procedure is omitted or required.

BRIEF DESCRIPTION OF THE DRAWINGS

The above and other objects, features, and advantages of the present invention will be more apparent from the following detailed description taken in conjunction with the accompanying drawings, in which:

FIG. 1 schematically illustrates a message format of a DREG-CMD message according to an embodiment of the present invention;

FIG. 3 illustrates a table of the LU-REQ message according to an embodiment of the present invention;

FIG. 5 illustrates a table of the RNG-REQ message according to an embodiment of the present invention;

FIG. 6 illustrates a table of the RNG-RSP message according to an embodiment of the present invention;

FIG. 7 illustrates a table of the MOB-PAG-ADV message according to an embodiment of the present invention;

FIG. 11 illustrates a table of the RNG-REQ message according to an embodiment of the present invention;

FIG. 12 illustrates a table of the RNG-RSP message according to an embodiment of the present invention; and FIG. 13 illustrates a table of the MOB-PAG-ADV message according to an embodiment of the present invention.

DETAILED DESCRIPTION OF THE PREFERRED EMBODIMENT

Figure 2:
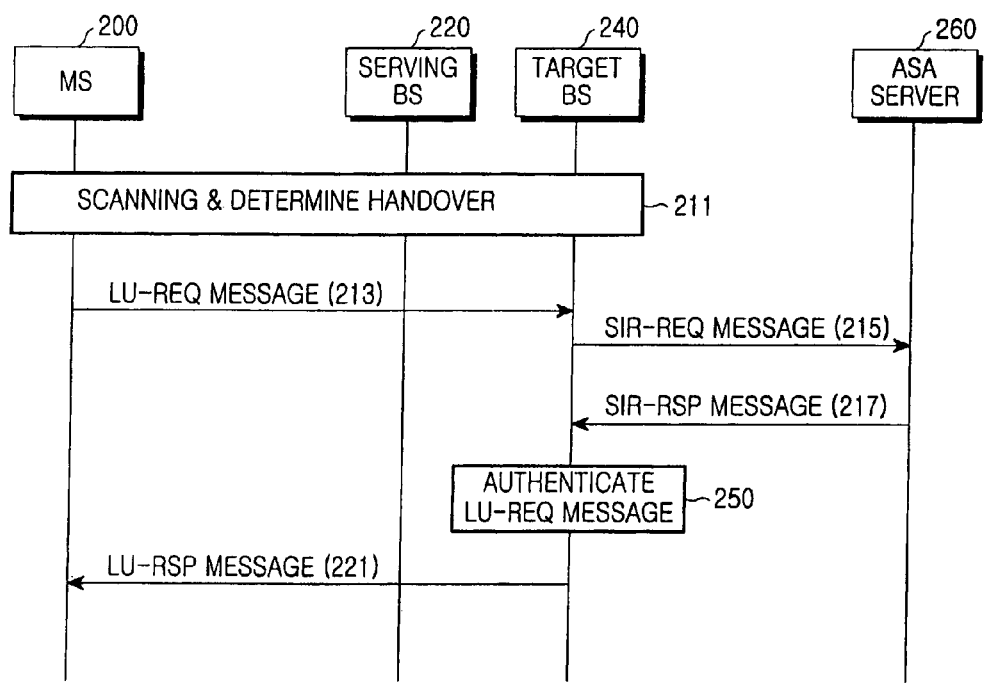
FIG. 2 is a signal flow diagram illustrating a process of authenticating the LU-REQ message of the MS according to an embodiment of the present invention.

Preferred embodiments of the present invention will be described in detail herein below with reference to the accompanying drawings. In the following description, the same elements will be designated by the same reference numerals although they are shown in different drawings.

Further, in the following description of the present invention, a detailed description of known functions and configurations incorporated herein will be omitted when it may obscure the subject matter of the present invention.

The present invention proposes a system and method by which a Mobile Station (MS) in an idle state performs fast network re-entry using session information of a previous final active state in a Broadband Wireless Access (BWA) communication system. In the following description, an Institute of Electrical and Electronics Engineers (IEEE) 802.16e communication system is discussed as an example of the BWA communication system. However, it should be noted that the fast network re-entry system and method proposed by the present invention can be applied to other communication systems as well.

Before describing the present invention, a Session Information Record (SIR) will be first defined.

When an MS transitions from an active state to an idle state, the MS releases all Medium Access Control (MAC) connections, such as a basic connection and a primary connection in the active state, and deletes security-associated information stored in the memory of the MS itself.

The SIR refers to minimum information, which must be stored by the MS and a system, e.g. a BS or an authentication server, in order to support a Reduced Call Setup (RCS), which defines fast transition from the idle state to the active state or location update when the MS performs idle handover. Hereinafter, the SIR will be described in detail.

An SIR includes a MAC address of the MS, an SIR identifier (SIR ID), a MAC version/Internet Protocol (IP) version/IP address, a Base Station (BS) identifier (BS ID) or an Authentication and Service ASA server ID (ASID), authentication information, and Subscriber Station (SS) call session information of Type, Length, Value (TLV) format.

The MAC address and the SIR ID are identifiers for identifying the SIR, so that the SIR can be identified by the MAC address and the SIR ID even when the connection information of the MS stored in the BS has been discarded due to the transition of the MS into the idle state. The authentication information includes an Authorization Key (AK) provided when authentication between the MS and the BS is accomplished, an available period of the AK, a Keyed-Hashing for Message Authentication Code (HMAC) tuple generated using an HMAC algorithm and the AK by the MS and the BS, and an available period of the HMAC tuple.

The SS call session information includes service flow information of a minimum physical layer (PHY), a MAC and each service instance, which are necessary in order for the MS in the idle state to receive or transmit the packet data. The SS call session information is used when the RCS is performed between the MS and the BS or when the location registration in the idle handover is performed.

The SS call session information includes an SS basic capability uploaded by the MS, an actual basic capability of the MS, an Automatic Retransmit Request (ARQ) parameter uploaded by the MS, a granted ARQ parameter of the MS, convergence capabilities uploaded by the MS, granted convergence capabilities and service flow information of the MS, security-associated information for each service flow except for Service Association ID (SAID) and Transport Connect ID (TCID), a Subscriber station's Basic Capability negotiation request (SBC-REQ) message, and basic capability negotiation parameters of the MS negotiated through a Subscriber station's Basic Capability negotiation response (SBC-RSP) message, which is a response to the SBC-REQ message.

The MS and the BS determine whether or not to store the SIR. When transitioning into the idle state, it is unnecessary for the MS or the BS to require or report storage of the SIR to the counterpart. Further, the information on whether to generate the SIR may be reported to the MS through an SIR_ID_INCL Information Element (IE) indicating inclusion or exclusion of an SIR identifier in a DeRegistration-Command (DREG-CMD) message, which is a MAC management message transmitted from the BS to the MS in response to a request of the MS for transition into the idle state transmitted from the MS to the BS. The SIR basically uses final session information. Here, the DREG-CMD message, which is a message newly proposed by the present invention, is generated by modifying the format of the DREG-CMD message of the typical IEEE 802.16e communication system. Alternatively, the DREG-CMD message according to an embodiment of the present invention may be generated with a totally new format instead of being generated by changing the format of the DREG-CMD message of the typical IEEE 802.16e communication system.

FIG. 1 schematically illustrates a message format of a DREG-CMD message according to an embodiment of the present invention. Referring to FIG. 1, the DREG-CMD message includes a plurality of IEs such as SIR_ID_INCL and SIR_ID. The SIR_ID_INCL indicates if the DREG-CMD message includes the SIR ID and the SIR_ID indicates the SIR ID when the SIR_ID_INCL indicates that the DREG-CMD message includes the SIR ID. The SIR ID is used to determine if the SIR stored in the MS coincides with the SIR stored in the BS, when the MS performs location update or RCS using the SIR.

The SIR is maintained during a predetermined time interval even when the location of the MS has changed or when the MS moves to a region of another BS or SIR management server due to network re-entry, etc. Thereafter, when the MS stays in the idle state and does not transit to the active state during the maintenance interval, the SIR is deleted. However, when the MS transitions from the idle state to the active state or the context of the SIR changes within the maintenance interval, the maintenance time interval is set again such that the SIR can be maintained during the reset maintenance interval. Further, when the power supply to the MS is interrupted, the SIR is deleted from the MS and the power interruption is reported to the system through the location update. Further, when the information included in the SIR is changed by the MS and the BS, the stored SIR is also updated instantly.

When the MS performs handover in the idle state, all MAC connections are released and security-associated information is deleted, such that it is impossible to authenticate a Location Update Request (LU-REQ) message according to the handover of the MS. Therefore, in order to authenticate the LU-REQ message transmitted from the MS, it is required that a target BS to which the handover of the MS is oriented should request the SIR of the MS from a serving BS of the MS or an Authentication and Service Authorization (ASA) server and receive the SIR of the MS corresponding to the request from the serving BS or the ASA server.

Hereinafter, authentication of the LU-REQ message of the MS will be briefly described.

First, the MS authenticates the LU-REQ message using an HMAC tuple, which is generated using an authorization key included in the SIR stored in the MS itself, and transmits the authenticated LU-REQ message to the target BS to which the handover is destined. Then, the target BS receives the LU-REQ message transmitted from the MS, requests the SIR of the MS to the serving BS of the MS or the ASA server according to the reception of the LU-REQ message, and then receives the SIR of the MS from the serving BS of the MS or the ASA server. After receiving the SIR of the MS in this way, the target BS authenticates the LU-REQ message using the received SIR of the MS.

FIG. 2 is a signal flow diagram illustrating a process of authenticating the LU-REQ message of the MS according to an embodiment of the present invention. Referring to FIG. 2, the MS 200 scans neighbor BSs and determines to perform handover from a serving BS from which the MS 200 currently receives service to a target BS 240, which is one of the scanned neighbor BSs, in step 211. Here, the operation in relation to the scanning and determination of handover has no direct relation to the present invention. Therefore, a detailed description thereof will be omitted here.

After determining the handover to the target BS 240, the MS 200 transmits the LU-REQ message to the target BS 240 in step 213. However, before transmitting the LU-REQ message, the MS 200 authenticates the LU-REQ message based on the authentication information in the SIR stored in advance in the MS. The LU-REQ message includes the ASID of the ASA server 260 connected to the MS 200.

FIG. 3 illustrates a table of the LU-REQ message according to an embodiment of the present invention. Referring to FIG. 3, the LU-REQ message includes a plurality of IEs such as ASID, AK, AK lifetime, HMAC Tuple, HMAC Tuple lifetime, and RCS Request, which indicates whether the corresponding MS requires the RCS, in accordance with the TLV format. The LU-REQ message in FIG. 3 is a message newly proposed by the present invention and is generated by modifying the format of the LU-REQ message of the typical IEEE 802.16e communication system. Alternatively, the LU-REQ message according to an embodiment of the present invention may be generated with a totally new format, instead of being generated by modifying the format of the LU-REQ message of the typical IEEE 802.16e communication system.

Referring back to FIG. 2, the target BS 240 receives the LU-REQ message from the MS 200 and detects the ASID from the received LU-REQ message. Then, the target BS 240 transmits a Session Information Record Request (SIR-REQ) message requiring the SIR of the MS 200 to the ASA server 260 in step 215. The SIR-REQ message includes a MAC address that is an identifier of the MS 200.

Upon receiving the SIR-REQ message from the target BS 240, the ASA server 260 detects the SIR of the MS 200 corresponding to the MAC address included in the SIR-REQ message from the database constructed in the ASA server 260. Further, the ASA server 260 inserts the detected SIR of the MS 200 in a Session Information Record Response (SIR-RSP) message and transmits the SIR-RSP message to the target BS 240, as a response to the SIR-REQ message, in step 217.

The target BS 240 receives the SIR-RSP message from the ASA server 260, detects the SIR of the MS 200 from the received SIR-RSP message, and authenticates the LU-REQ message by using the HMAC Tuple in the detected SIR in step 250. Upon succeeding in the authentication of the LU-REQ message, the target BS 240 transmits the LU-RSP message to the MS 200 as a response to the LU-REQ message in step 221.

When the location update according to idle handover of the MS is performed as described above, the SIR of the MS controlled by the serving BS of the MS or the higher class server, i.e., the Authentication and Service Authorization (ASA) server, is transferred to a new serving BS, i.e., the target BS or a new ASA server. Thereafter, in the network re-entry process, it is unnecessary for the BS to perform some operations such as acquisition of SIR or authentication of a message, such that the MS can achieve fast network re-entry.

Figure 4:
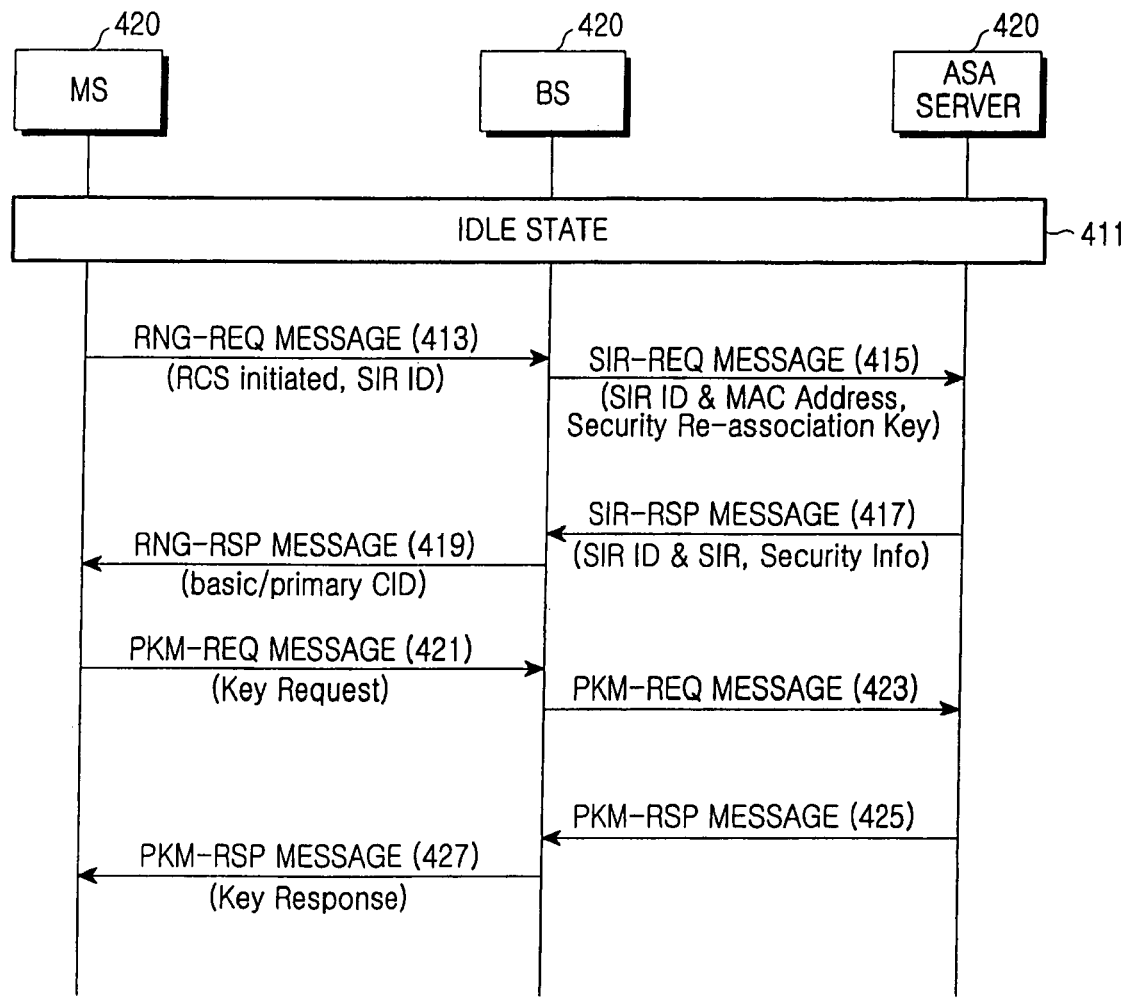
FIG. 4 is a signal flow diagram illustrating a process of fast network re-entry according to an embodiment of the present invention.

FIG. 4 is a signal flow diagram illustrating a process of fast network re-entry according to an embodiment of the present invention. More specifically, the fast network re-entry process illustrated in FIG. 4 corresponds to a fast network re-entry process after the location update according to the idle handover of the MS is performed as described above.

Referring to FIG. 4, the MS 400 stays in the idle state in step 411 and then transmits a ranging request (RNG-REQ) message to the BS, which is the target BS in step 413. The RNG-REQ message is a message newly proposed by the present invention and is generated by modifying the format of the RNG-REQ message of the typical IEEE 802.16e communication system. Alternatively, the RNG-REQ message according to an embodiment of the present invention may be generated with a totally new format, instead of being generated by modifying the format of the RNG-REQ message of the typical IEEE 802.16e communication system.

FIG. 5 illustrates a table of the RNG-REQ message according to an embodiment of the present invention. Referring to FIG. 5, the RNG-REQ message includes a plurality of IEs such as RCS Request, Request Type, SIR identifier, and ASID in accordance with the TLV format. Here, the Request Type has a length of one byte, i.e., 8 bits. When the first bit (bit #0) from among the 8 bits of the Request Type has a value of 1, it implies that the RCS is requested.

The BS 420 receives the RNG-REQ message and detects the SIR ID from the received RNG-REQ message. The BS 420 determines if an SIR corresponding to the detected SIR ID exists in the database of the BS 420. When no SIR corresponding to the detected SIR ID exists in the database of the BS 420, the BS transmits the SIR-REQ message to the ASA server 440, which is an ASA server corresponding to the ASID included in the received RNG-REQ message in step 415. The SIR-REQ message includes an SIR ID and a MAC address, which is an identifier of the MS 400.

Upon receiving the SIR-REQ message from the BS 420, the ASA server 440 detects the SIR of the MS 400 corresponding to the SIR ID and the MAC address included in the SIR-REQ message from the database in the ASA server 440. Then, the ASA server 440 inserts the detected SIR of the MS 400 in an SIR-RSP message and transmits the SIR-RSP message to the BS 420 as a response to the SIR-REQ message in step 417.

When an SIR corresponding to the detected SIR ID exists in the database of the BS 420, transmission of the SIR-REQ message and reception of the SIR-RSP message are omitted. The BS 420 detects the SIR from the SIR-RSP message and authenticates the RNG-REQ message in accordance with the HAMC Tuple of the detected SIR. Upon authenticating the RNG-REQ message, the BS 420 transmits a ranging response (RNG-RSP) message to the MS 400 as a response to the RNG-REQ message in step 419. The RNG-RSP message is a message newly proposed by the present invention and is generated by modifying the format of the RNG-RSP message of the typical IEEE 802.16e communication system. Alternatively, the RNG-RSP message according to an embodiment of the present invention may be generated with a totally new format, instead of being generated by modifying the format of the RNG-RSP message of the typical IEEE 802.16e communication system.

FIG. 6 illustrates a table of the RNG-RSP message according to an embodiment of the present invention. Referring to FIG. 6, the RNG-RSP message includes a plurality of IEs such as RCS Response, Response Type and ASID in accordance with the TLV format. The Response Type has a length of one byte, i.e., 8 bits. When the first bit (bit #0) from among the 8 bits of the Response Type has a value of 1, it indicates that the RCS has been totally accepted ('Reduced Call Setup totally accepted'). When the second bit (bit #1) from among the 8 bits of the Response Type has a value of 1, it indicates that the RCS has been rejected and the MS is forced to perform a normal network entry procedure ('Reduced call Setup Rejected and SS is forced to perform a normal network entry procedure'). When the third bit (bit #2) has a value of 1, it indicates that SS Basic Capability (SBC) re-negotiation is required ('SS Basic Capability (SBC) re-negotiation required'). When the fourth bit (bit #3) has a value of 1, it indicates that Privacy Key Management (PKM) re-negotiation is required ('Privacy Key Management (PKM) re-negotiation required'). When the fifth bit (bit #4) has a value of 1, it indicates that Registration (REG) re-negotiation is required ('Registration (REG) re-negotiation required'). When the sixth bit (bit #5) has a value of 1, it indicates that Internet Protocol (IP) re-allocation is required ('Internet Protocol (IP) re-allocation required'). Further, although not illustrated in FIG. 6, the RNG-RSP message includes an ASID, a basic CID allocated to the MS 400, and a primary CID.

As the MS 400 receives the RNG-RSP message from the BS 420, it is possible to omit the SBC negotiation procedure, which includes SBC-REQ message transmission and SBC-RSP reception, the Privacy Key Management (PKM) procedure, which includes Privacy Key Management Request (PKM-REQ) message transmission and Privacy Key Management Response (PKM-RSP) message reception, and the registration procedure, which includes Registration Request (REG-REQ) message transmission and Registration Response (REG-RSP) message reception, during the existing network re-entry process. As a result, it is possible to perform fast network re-entry.

However, in order to refresh the privacy key value, a one time PKM-REQ message transmission and the PKM-RSP message reception is performed, instead of performing an at least three time PKM-REQ message transmission and the PKM-RSP message reception as in the typical network re-entry process. That is, the MS 400 transmits the PKM-REQ message to the BS 420 in step 421.

Upon receiving the PKM-REQ message from the MS 400, the BS 420 transmits the PKM-REQ message to the ASA server 440 in step 423. The ASA server 440 transmits the PKM-RSP message to the BS 420, as a response to the PKM-REQ message, in step 425. Upon receiving the PKM-RSP message from the ASA server 440, the BS 420 transmits the PKM-RSP message to the MS 400 in step 427.

Although FIG. 4 illustrates that the fast network re-entry is accomplished through the RNG-REQ message transmission and the RNG-RSP message reception, it is possible to achieve the fast network re-entry through the SBC-REQ message transmission and the SBC-RSP message reception.

When there is information that the BS wants to change from among the final session information stored in the SIR of the BS, the BS enables the MS to perform the negotiation only about the corresponding information. For example, it is possible to re-perform only the MS authentication while maintaining setup values of the physical layer, the MAC layer, and the Convergence Sublayer (CS) or to re-negotiate only the setup values of the CS.

When there is packet data to be transmitted from the BS to the MS, the BS pages the MS using a paging message in which the SIR ID is inserted.

Hereinafter, a format of a Mobile Paging Advertisement (MOB-PAG-ADV) message for paging the MS will be described with reference to FIG. 7. It is noted that the MOB-PAG-ADV message is a message newly proposed by the present invention and is generated by modifying the format of the MOB-PAG-ADV message of the typical IEEE 802.16e communication system. Alternatively, the MOB-PAG-ADV message according to an embodiment of the present invention may be generated with a totally new format, instead of being generated by modifying the format of the MOB-PAG-ADV message of the typical IEEE 802.16e communication system.

FIG. 7 illustrates a table of the MOB-PAG-ADV message according to an embodiment of the present invention. Referring to FIG. 7, the MOB-PAG-ADV message includes a plurality of IEs such as SIR_ID_INCL and SIR_ID. The SIR_ID_INCL represents if the MOB-PAG-ADV message includes the SIR ID or not, and the SIR_ID represents the SIR ID when the SIR_ID_INCL represents that the MOB-PAG-ADV message includes the SIR ID.

If the BS stores an SIR having the same SIR ID as the SIR ID that the BS received from the MS as described above or if it is possible to acquire the SIR from the existing authentication server, etc., it is naturally possible to perform a termination call setup through a process similar to the process in which the MS requests fast network re-entry.

Figure 8:
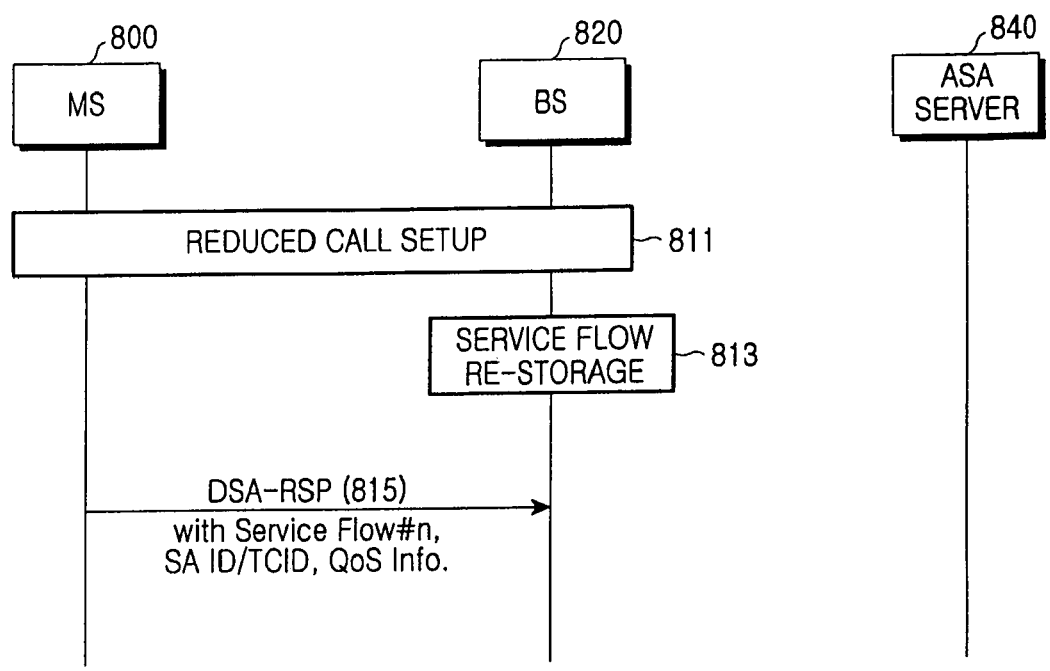
FIG. 8 is a signal flow diagram illustrating a process of SAID/TCID mapping and dynamic service for each service flow according to an embodiment of the present invention.

FIG. 8 is a signal flow diagram illustrating a process of SAID/TCID mapping and dynamic service for each service flow according to an embodiment of the present invention. Referring to FIG. 8, after the MS 800 performs the RCS procedure with the BS 820 in step 811, it is necessary to perform authentication for each service flow when the SIR stores service flows, although not shown in FIG. 8. After authenticating each service flow, the BS 820 re-stores the authenticated service flows in step 813. The MSS 800 transmits a Dynamic Service Add Response (DSA-RSP) message to the BS 820 in an unsolicited manner in step 815. Here, the DSA-RSP message is transmitted in order to reset the dynamic service for the MS 800 according to each service flow by re-mapping the SAID and TCID.

Figure 9:
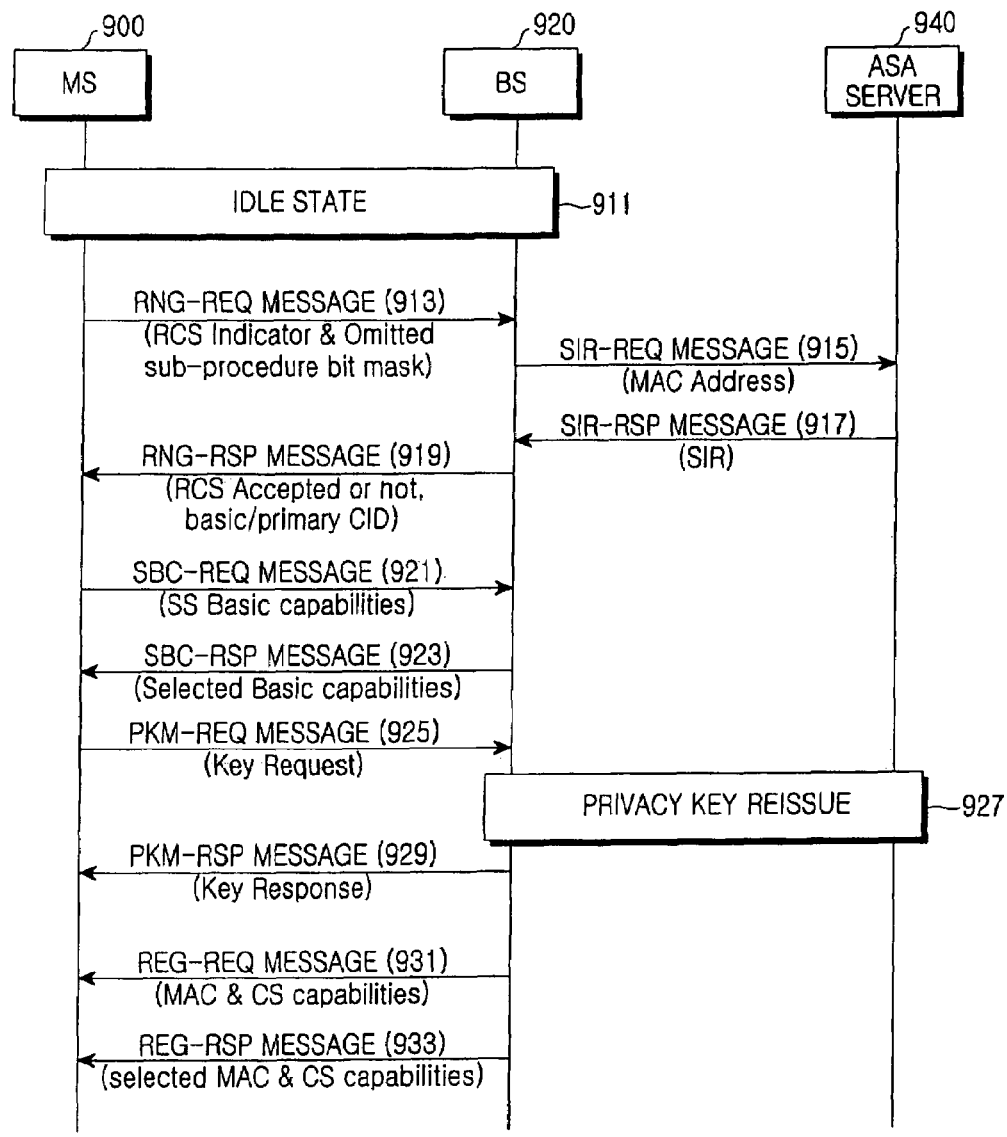
FIG. 9 is a signal flow diagram illustrating a fast network re-entry process according to an embodiment of the present invention.

FIG. 9 is a signal flow diagram illustrating a fast network re-entry process according to an embodiment of the present invention. More specifically, FIG. 9 is based on an assumption that the shown fast network re-entry process is a process after a previous serving BS registers the SIR (previous final session information) of the MS 900 in the ASA server 940 according to transition of the MS 900 into the idle state, or a process after a previous serving BS registers the SIR (previous final session information) of the MS 900 in the ASA server 940 according to handover of the MS 900 or a process after a previous serving BS registers the SIR (previous final session information) of the MS 900 in the ASA server 940 according to location update following the handover of the MS 900.

Referring to FIG. 9, the MS 900 stays in the idle state in step 911 and then transmits the RNG-REQ message to the BS 920 in step 913. The RNG-REQ message is a message newly proposed by the present invention and is generated by modifying the format of the RNG-REQ message of the typical IEEE 802.16e communication system. Alternatively, the RNG-REQ message according to an embodiment of the present invention may be generated with a totally new format, instead of being generated by modifying the format of the RNG-REQ message of the typical IEEE 802.16e communication system.

FIG. 11 illustrates a table of the RNG-REQ message according to an embodiment of the present invention. The RNG-REQ message includes a plurality of IEs such as RCS Request and Request Type in accordance with the TLV format. Here, the Request Type has a length of one byte, i.e., 8 bits, each bit of which has the following meaning.

When the first bit (bit #0) from among the 8 bits of the Request Type has a value of 1, it indicates that it is possible to omit the SBC-REQ message transmission and SBC-RSP message reception during the current network re-entry procedure ('omit SBC-REQ/RSP management message during the current network re-entry processing'). When the second bit (bit #1) has a value of 1, it indicates that it is possible to omit the PKM-REQ message transmission and PKM-RSP message reception during the current network re-entry procedure ('omit PKM-REQ/RSP management messages during current network re-entry processing'). When the third bit (bit #2) has a value of 1, it indicates that it is possible to omit the REG-REQ message transmission and REG-RSP message reception during the current network re-entry procedure ('omit REG-REQ/RSP management messages during current network re-entry processing'). When the fourth bit (bit #3) has a value of 1, it indicates that it is possible to omit transmission/reception of network address acquisition messages during the current network re-entry procedure ('omit Network Address Acquisition management messages during current network re-entry processing'). When the fifth bit (bit #4) has a value of 1, it indicates that it is possible to omit transmission/reception of time information acquisition messages during the current network re-entry procedure ('omit Time of Day Acquisition management messages during current network re-entry processing'). When the sixth bit (bit #5) has a value of 1, it indicates that it is possible to omit transmission/reception of TFTP (Trivial File Transfer Protocol) messages during the current network re-entry procedure ('omit TFTP management messages during current network re-entry processing'). Further, although not illustrated in FIG. 11, the RNG-REQ message includes an SIR ID and an ASID in accordance with the TLV format.

Referring back to FIG. 9, the BS 920 examines if an SIR corresponding to the SIR ID included in the RNG-REQ message from the MS 900 exists in the database of the BS 920. When no SIR corresponding to the detected SIR ID exists in the database of the BS 920, the BS 920 transmits the SIR-REQ message to the ASA server 940, which is an ASA server corresponding to the ASID included in the received RNG-REQ message, in step 915. The SIR-REQ message includes an SIR ID and a MAC address, which is an identifier of the MS 900.

Upon receiving the SIR-REQ message from the BS 920, the ASA server 940 detects the SIR of the MS 900 corresponding to the SIR ID and the MAC address included in the SIR-REQ message from the database in the ASA server 940. Then, the ASA server 940 inserts the detected SIR of the MS 900 in an SIR-RSP message and transmits the SIR-RSP message to the BS 920, as a response to the SIR-REQ message, in step 917.

When an SIR corresponding to the detected SIR ID exists in the database of the BS 920, transmission of the SIR-REQ message and reception of the SIR-RSP message are omitted. The BS 920 detects the SIR from the SIR-RSP message and authenticates the RNG-REQ message in accordance with the HAMC Tuple of the detected SIR.

Upon succeeding in the authentication of the RNG-REQ message, the BS 920 transmits a ranging response (RNG-RSP) message to the MS 900, as a response to the RNG-REQ message, in step 919. Herein, the RNG-RSP message is a message newly proposed by the present invention and is generated by modifying the format of the RNG-RSP message of the typical IEEE 802.16e communication system. Alternatively, the RNG-RSP message according to an embodiment of the present invention may be generated with a totally new format, instead of being generated by modifying the format of the RNG-RSP message of the typical IEEE 802.16e communication system.

FIG. 12 illustrates a table of the RNG-RSP message according to an embodiment of the present invention. Referring to FIG. 12, the RNG-RSP message includes a plurality of IEs such as RCS Response and Response Type in accordance with the TLV format. Further, although not shown in FIG. 12, the RNG-RSP message includes an ASID, a basic CID allocated to the MS 900, and a primary CID.

The Response Type has a length of one byte, i.e., 8 bits, each bit of which will be described below.

When the first bit (bit #0) from among the 8 bits of the Response Type has a value of 1, it indicates that it is possible to omit the SBC-REQ message transmission and SBC-RSP message reception during the current network re-entry procedure ('omit SBC-REQ/RSP management message during the current network re-entry processing'). When the second bit (bit #1) has a value of 1, it indicates that it is possible to omit the PKM-REQ message transmission and PKM-RSP message reception during the current network re-entry procedure ('omit PKM-REQ/RSP management messages during current network re-entry processing'). When the third bit (bit #2) has a value of 1, it indicates that it is possible to omit the REG-REQ message transmission and REG-RSP message reception during the current network re-entry procedure ('omit REG-REQ/RSP management messages during current network re-entry processing'). When the fourth bit (bit #3) has a value of 1, it indicates that it is possible to omit transmission/reception of network address acquisition messages during the current network re-entry procedure ('omit Network Address Acquisition management messages during current network re-entry processing'). When the fifth bit (bit #4) has a value of 1, it indicates that it is possible to omit transmission/reception of time information acquisition messages during the current network re-entry procedure ('omit Time of Day Acquisition management messages during current network re-entry processing'). When the sixth bit (bit #5) has a value of 1, it indicates that it is possible to omit transmission/reception of TFTP messages during the current network re-entry procedure ('omit TFTP management messages during current network re-entry processing').

Upon receiving the RNG-RSP message from the BS 920, the MS 900 performs the following steps of the network re-entry process in accordance with the bit values of the Response Type of the RNG-RSP message. For example, when the first bit (bit #0) from among the bits of the Response Type has a value of 1, the SBC-REQ message transmission of step 921 and SBC-RSP message reception of step 923 are omitted. When the second bit (bit #1) from among the bits of the Response Type has a value of 1, the PKM-REQ message transmission of step 925 and PKM-RSP message reception of step 929 are omitted. When the third bit (bit #2) from among the bits of the Response Type has a value of 1, the REG-REQ message transmission of step 931 and REG-RSP message reception of step 933 are omitted.

When the second bit (bit #1) from among the bits of the Response Type has a value of 0, the PKM-REQ message transmission in step 925 and PKM-RSP message reception in step 929 must be performed, so that the BS 920 must perform a privacy key reissue step in step 927 for refreshing the privacy key value together with the ASA server 940. Here, the reduced network re-entry process refers to a process when the first bit (bit #0) through the third bit (bit #2) of the Response Type of the RNG-RSP message are set to have a value of 1, such that the network re-entry procedure includes only the ranging procedure, which includes the RNG-REQ message transmission steps and the RNG-RSP message reception step, while omitting all of the SBC-REQ message transmission and SBC-RSP message reception steps, the PKM-REQ message transmission and PKM-RSP message reception steps and the REG-REQ message transmission and REG-RSP message reception steps.

When packet data to be transmitted from the BS to the MS without request occur, the BS must page the MS and transmit the packet data to the MS, which case will be described with reference to FIG. 10.

Figure 10:
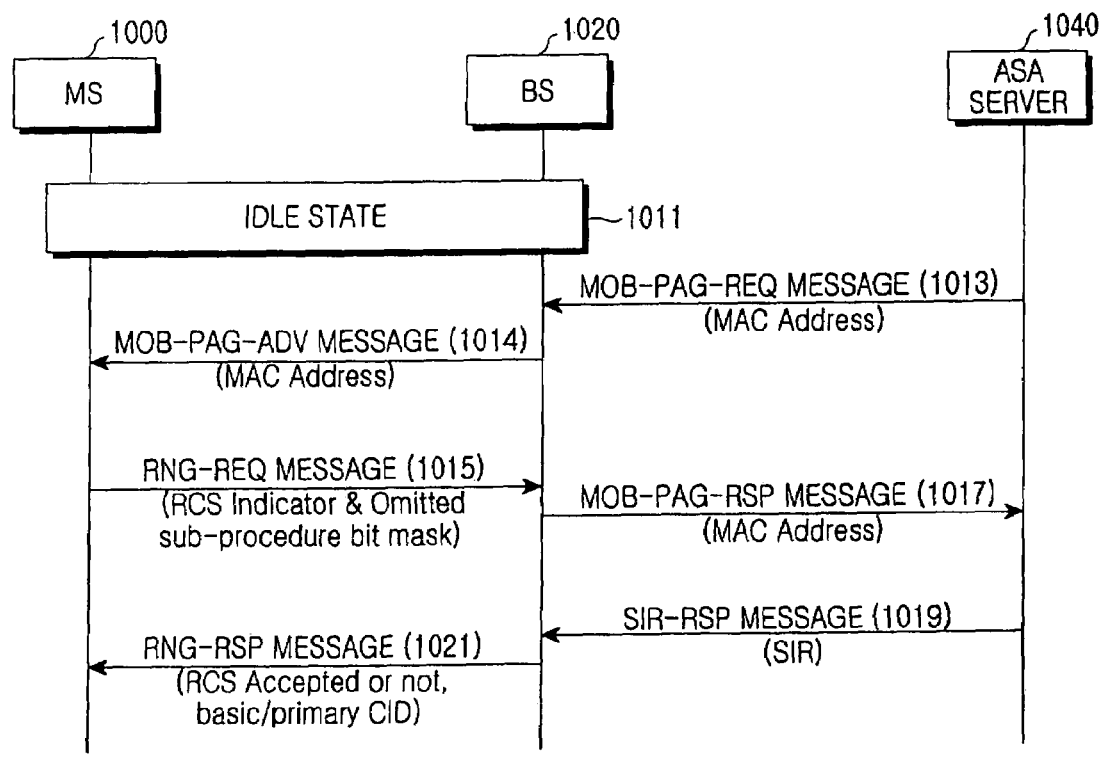
FIG. 10 is a signal flow diagram of a network re-entry process when the BS pages the MS in the idle state according to an embodiment of the present invention.

FIG. 10 is a signal flow diagram of a network re-entry process when the BS pages the MS in the idle state according to an embodiment of the present invention. Referring to FIG. 10, the MS 1000 stays in the idle state in step 1011. If the ASA server 1040 detects a paging to the MS 1000, the ASA server 1040 transmits a Mobile Paging Request (MOB-PAG-REQ) message to the BS 1020 in step 1013. Upon receiving the MOB-PAG-REQ message from the ASA server 1040, the BS 1020 transmits a MOB-PAG-ADV message to the MS 1000 in step 1014. Herein, the MOB-PAG-ADV message is a message newly proposed by the present invention and is generated by modifying the format of the MOB-PAG-ADV message of the typical IEEE 802.16e communication system. Alternatively, the MOB-PAG-ADV message according to an embodiment of the present invention may be generated with a totally new format, instead of being generated by modifying the format of the MOB-PAG-ADV message of the typical IEEE 802.16e communication system.

FIG. 13 illustrates a table of the MOB-PAG-ADV message according to an embodiment of the present invention. Referring to FIG. 13, the MOB-PAG-ADV message includes an IE named RCS_INDICATOR, which indicates if the RCS is required. When the RCS_INDICATOR has a bit value of 1, it indicates that the RCS is required.

Referring back to FIG. 10, upon receiving the MOB-PAG-ADV message from the BS 1020, the MS 1000 sets the RCS Request and the Request Type of the RNG-REQ message in accordance with the bit value of the RCS_INDICATOR in the MOB-PAG-ADV message and then transmits the RNG-REQ message to the BS 1020 in step 1015. The RCS Request and the Request Type of the RNG-REQ message have been already described above, so repetition thereof will be omitted here.

Upon receiving the RNG-REQ message from the MS 1000, the BS 1020 transmits a Mobile Paging Response (MOB-PAG-RSP) message to the ASA server 1040, as a response to the MOB-PAG-REQ message, in step 1017.

Upon receiving the MOB-PAG-RSP message from the BS 1020, the ASA server 1040 transmits an SIR-RSP message carrying the SIR of the MS 1000 to the BS 1020 in an unsolicited manner in step 1019.

Upon receiving the SIR-RSP message from the ASA server 1040, the BS 1020 transmits an RNG-RSP message including the RCS Response and the Response Type to the MS 1000 as a response to the RNG-REQ message in step 1021. The RCS Response and the Response Type of the RNG-RSP message have been already described above, so repetition thereof will be omitted here. The process of network re-entry after reception of the RNG-RSP message is progressed in accordance with the RCS Response and the Response Type of the RNG-RSP message.

According to the present invention, as described above, when an MS transitions into the idle state, the MS stores the SIR, which is final session information in the active state before the idle state and then performs a network re-entry process, such that the MS can achieve fast network re-entry, which omits unnecessary steps by using the SIR. Such fast network re-entry, omitting unnecessary message transmission/reception steps, as described above, reduces the message signaling load. Therefore, the present invention can improve the entire system performance.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for fast network re-entry of a mobile station in a broadband wireless access communication system, the method comprising the steps of:

transmitting a first message requesting fast network re-entry to a base station when the mobile station detects that it is necessary to perform network re-entry to the base station in an idle state in which the mobile station stores final session information of a previous active state;

receiving a second message approving the fast network re-entry from the base station; and performing the fast network re-entry with the base station.

2. The method as claimed in claim 1, wherein the first message includes first information indicating that the network re-entry to be performed is the fast network re-entry, and second information indicating processes that must be omitted during the fast network re-entry from among a plurality of processes performed in a conventional network re-entry.

3. The method as claimed in claim 2, wherein the second message includes third information indicating approval of the fast network re-entry, and fourth information indicating processes that must be omitted during the fast network re-entry from among a plurality of processes performed in a conventional network re-entry.

4. The method as claimed in claim 3, wherein the step of performing the fast network re-entry with the base station comprises omitting the processes from among the plurality of processes performed in the conventional network re-entry based on the fourth information; and performing only remaining processes.

5. The method as claimed in claim 1, wherein the first message is a ranging request message including first information and second information, the first information indicating that the network re-entry is the fast network re-entry, the second information indicating processes that must be omitted during the fast network re-entry from among a subscriber station basic capability negotiation process, a privacy key management process, a network address acquisition process, a time information acquisition process, and a TFTP (Trivial File Transfer Protocol) process, which are performed in a conventional network re-entry.

6. The method as claimed in claim 5, wherein the second message is a ranging response message including third information and fourth information, the third information indicating approval of the fast network re-entry, the fourth information indicating processes which must be omitted during the fast network re-entry from among the subscriber station basic capability negotiation process, the privacy key management process, the network address acquisition process, the time information acquisition process, and the TFTP process, which are performed in the conventional network re-entry.

7. The method as claimed in claim 6, wherein the step of performing the fast network re-entry with the base station, comprises:
   omitting processes from among the subscriber station basic capability negotiation process, the privacy key management process, the network address acquisition process, the time information acquisition process, and the TFTP process, based on the fourth information; and
   performing only remaining processes.

8. A method for fast network re-entry of a mobile station in a broadband wireless access communication system including the mobile station, a serving base station that provides service to the mobile station, a target base station, which is different from the serving base station, and an ASA (Authentication and Service Authorization) server connected to the target base station, the method comprising the steps of:
   storing final session information by the mobile station when transitioning into an idle state;
   transmitting the final session information to the target base station so that the target base station and the ASA server store the final session information, when the mobile station detects that handover from the serving base station to the target base station is necessary, after the mobile station stores the final session information;
   transmitting a first message requiring fast network re-entry to the target base station;
   receiving a second message approving the fast network re-entry from the target base station; and
   performing the fast network re-entry with the target base station.

9. The method as claimed in claim 8, wherein the first message includes first information indicating that the network re-entry is the fast network re-entry, and second information indicating processes that must be omitted during the fast network re-entry from among a plurality of processes performed in a conventional network re-entry.

10. The method as claimed in claim 9, wherein the second message includes third information indicating approval of the fast network re-entry, and fourth information indicating the processes that must be omitted during the fast network re-entry from among the plurality of processes performed in the conventional network re-entry.

11. The method as claimed in claim 10, wherein the step of performing the fast network re-entry with the target base station, comprises:
   omitting processes from among the plurality of processes performed in the conventional network re-entry based on the fourth information; and
   performing only remaining processes.

12. The method as claimed in claim 8, wherein the first message is a ranging request message including first information and second information, the first information indicating that the network re-entry is the fast network re-entry, the second information indicating processes which must be omitted during the fast network re-entry from among a subscriber station basic capability negotiation process, a privacy key management process, a network address acquisition process, a time information acquisition process and a TFTP (Trivial File Transfer Protocol) process, which are performed in a conventional network re-entry.

13. The method as claimed in claim 12, wherein the second message is a ranging response message including third information and fourth information, the third information indicating approval of the fast network re-entry, the fourth information indicating the processes that must be omitted during the fast network re-entry from among the subscriber station basic capability negotiation process, the privacy key management process, the network address acquisition process, the time information acquisition process and the TFTP process, which are performed in the conventional network re-entry.

14. The method as claimed in claim 13, wherein the step of performing the fast network re-entry with the target base station, comprises:
   omitting processes from among the subscriber station basic capability negotiation process, the privacy key management process, the network address acquisition process, the time information acquisition process and the TFTP process, which are performed in the conventional network re-entry, based on the fourth information; and
   performing only remaining processes.

15. A method for fast network re-entry of a base station in a broadband wireless access communication system, the method comprising the steps of:
   receiving a first message requiring fast network re-entry from a mobile station that is in an idle state during which the mobile station stores final session information of a previous active state;
   authenticating the first message using final session information of the mobile station that is previously stored in the base station;
   transmitting a second message approving the fast network re-entry to the mobile station, after the first message is authenticated; and
   performing the fast network re-entry with the mobile station.

16. The method as claimed in claim 15, wherein the first message includes first information indicating that the network re-entry is the fast network re-entry, and second information indicating processes that must be omitted during the fast network re-entry from among a plurality of processes performed in a conventional network re-entry.

17. The method as claimed in claim 16, wherein the second message includes third information indicating approval of the fast network re-entry, and fourth information indicating the processes that must be omitted during the fast network re-entry from among the plurality of processes performed in the conventional network re-entry.

18. The method as claimed in claim 17, wherein the step of performing the fast network re-entry with the mobile station, comprises:
   omitting processes from among the plurality of processes performed in the conventional network re-entry, based on the fourth information; and
   performing only remaining processes.

19. The method as claimed in claim 15, wherein the first message is a ranging request message including first information and second information, the first information indicating that the network re-entry is the fast network re-entry, the second information indicating processes which must be omitted during the fast network re-entry from among a subscriber station basic capability negotiation process, a privacy key management process, a network address acquisition process, a time information acquisition process, and a TFTP (Trivial File Transfer Protocol) process, which are performed in a conventional network re-entry.

20. The method as claimed in claim 19, wherein the second message is a ranging response message including third information and fourth information, the third information indicating approval of the fast network re-entry, the fourth information indicating the processes that must be omitted during the fast network re-entry from among the subscriber station basic capability negotiation process, the privacy key management process, the network address acquisition process, the time information acquisition process, and the TFTP process, which are performed in the conventional network re-entry.

21. The method as claimed in claim 20, wherein the step of performing the fast network re-entry together with the mobile station, comprises:
    omitting processes from among the subscriber station basic capability negotiation process, the privacy key management process, the network address acquisition process, the time information acquisition process and the TFTP process, which are performed in the conventional network re-entry, based on the fourth information; and
    performing only remaining processes.

22. A method for fast network re-entry in a broadband wireless access communication system, the method comprising the steps of:
    transmitting a first message requiring fast network re-entry from a mobile station to a base station, when the mobile station detects that it is necessary to perform network re-entry to the base station in an idle state during which the mobile station stores final session information of a previous active state;
    receiving the first message by the base station;
    authenticating the first message by the base station using final session information of the mobile station that is previously stored in the base station;
    transmitting a second message approving the fast network re-entry to the mobile station, the first message is authenticated; and
    performing the fast network re-entry by the mobile station and the base station.

23. The method as claimed in claim 22, wherein the first message includes first information indicating that the network re-entry to be performed is the fast network re-entry, and second information indicating processes that must be omitted during the fast network re-entry from among a plurality of processes performed in a conventional network re-entry.

24. The method as claimed in claim 23, wherein the second message includes third information indicating approval of the fast network re-entry, and fourth information indicating the processes that must be omitted during the fast network re-entry from among the plurality of processes performed in the conventional network re-entry.

25. The method as claimed in claim 24, wherein the step of performing the fast network re-entry by the mobile station together with the base station, comprises:
    omitting processes from among the plurality of processes performed in the conventional network re-entry based on the fourth information; and
    performing only remaining processes.

26. The method as claimed in claim 22, wherein the first message is a ranging request message including first information and second information, the first information indicating that the network re-entry to be performed is the fast network re-entry, the second information indicating processes that must be omitted during the fast network re-entry from among a subscriber station basic capability negotiation process, a privacy key management process, a network address acquisition process, a time information acquisition process, and a TFTP (Trivial File Transfer Protocol) process, which are performed in a conventional network re-entry.

27. The method as claimed in claim 26, wherein the second message is a ranging response message including third information and fourth information, the third information indicating approval of the fast network re-entry, the fourth information indicating processes that must be omitted during the fast network re-entry from among the subscriber station basic capability negotiation process, the privacy key management process, the network address acquisition process, the time information acquisition process, and the TFTP process, which are performed in the conventional network re-entry.

28. The method as claimed in claim 27, wherein the step of performing the fast network re-entry by the mobile station together with the base station, comprises:
    omitting processes from among the subscriber station basic capability negotiation process, the privacy key management process, the network address acquisition process, the time information acquisition process, and the TFTP process, which are performed in the conventional network re-entry, based on the fourth information; and
    performing only remaining processes.

29. A method for fast network re-entry in a broadband wireless access communication system that includes the mobile station, a serving base station that provides service to the mobile station, a target base station, which is different from the serving base station, and an ASA (Authentication and Service Authorization) server connected to the target base station, the method comprising the steps of:
    transmitting final session information from the mobile station to the target base station so that the target base station and the ASA server store the final session information, when the mobile station detects that handover from the serving base station to the target base station is necessary, after the mobile station stores the final session information while transitioning into an idle state;
    receiving the final session information in the target base station;
    storing the final session information in the target base station;
    transmitting a first message requiring the fast network re-entry to the target base station;
    receiving the first message by the target base station;
    authenticating the first message by the target base station using final session information of the mobile station stored in advance in the target base station;
    transmitting a second message approving the fast network re-entry to the mobile station, after authenticating the first message; and
    performing the fast network re-entry by the mobile station and the target base station.

30. The method as claimed in claim 29, wherein the first message includes first information indicating that the network re-entry to be performed is the fast network re-entry, and second information indicating processes that must be omitted during the fast network re-entry from among a plurality of processes performed in a conventional network re-entry.

31. The method as claimed in claim 30, wherein the second message includes third information indicating approval of the fast network re-entry, and fourth information indicating the processes that must be omitted during the fast network re-entry from among the plurality of processes performed in the conventional network re-entry.

32. The method as claimed in claim 31, wherein the step of performing the fast network re-entry by the mobile station together with the target base station comprises:
    omitting processes from among the plurality of processes performed in the conventional network re-entry, based on the fourth information; and
    performing only remaining processes.

33. The method as claimed in claim 29, wherein the first message is a ranging request message including first information and second information, the first information indicating that the network re-entry to be performed is the fast network re-entry, the second information indicating processes that must be omitted during the fast network re-entry from among a subscriber station basic capability negotiation process, a privacy key management process, a network address acquisition process, a time information acquisition process, and a TFTP (Trivial File Transfer Protocol) process, which are performed in a conventional network re-entry.

34. The method as claimed in claim 33, wherein the second message is a ranging response message including third information and fourth information, the third information indicating approval of the fast network re-entry, the fourth information indicating processes that must be omitted during the fast network re-entry from among the subscriber station basic capability negotiation process, the privacy key management process, the network address acquisition process, the time information acquisition process, and the TFTP process, which are performed in the conventional network re-entry.

35. The method as claimed in claim 34, wherein the step of performing the fast network re-entry by the mobile station together with the target base station comprises:
    omitting processes from among the subscriber station basic capability negotiation process, the privacy key management process, the network address acquisition process, the time information acquisition process, and the TFTP process, which are performed in the conventional network re-entry, based on the fourth information; and
    performing only remaining processes.

36. A system for fast network re-entry in a broadband wireless access communication system, the system comprising:
    a base station; and
    a mobile station for transmitting a first message requiring fast network re-entry to the base station when the mobile station detects that it is necessary to perform network re-entry to the base station in an idle state during which the mobile station stores final session information of a previous active state, the mobile station performing the fast network re-entry together with the base station when receiving a second message approving the fast network re-entry from the base station,
    wherein the base station receives the first message, authenticates the first message using final session information of the mobile station that is previously stored in the base station, transmits the second message to the mobile station, after authenticating the first message, and performs the fast network re-entry with the mobile station.

37. The system as claimed in claim 36, wherein the first message comprises:
    first information indicating that the network re-entry to be performed is the fast network re-entry; and
    second information indicating processes that must be omitted during the fast network re-entry from among a plurality of processes performed in a conventional network re-entry.

38. The system as claimed in claim 37, wherein the second message comprises:
    third information indicating approval of the fast network re-entry; and
    fourth information indicating the processes that must be omitted during the fast network re-entry from among the plurality of processes performed in the conventional network re-entry.

39. The system as claimed in claim 38, wherein the step of performing the fast network re-entry by the mobile station together with the base station comprises:
    omitting processes from among the plurality of processes performed in the conventional network re-entry, based on the fourth information; and
    performing only remaining processes.

40. The system as claimed in claim 36, wherein the first message is a ranging request message including first information and second information, the first information indicating that the network re-entry to be performed is the fast network re-entry, the second information indicating processes that must be omitted during the fast network re-entry from among a subscriber station basic capability negotiation process, a privacy key management process, a network address acquisition process, a time information acquisition process, and a TFTP (Trivial File Transfer Protocol) process, which are performed in a conventional network re-entry.

41. The system as claimed in claim 40, wherein the second message is a ranging response message including third information and fourth information, the third information indicating approval of the fast network re-entry, the fourth information indicating the processes that must be omitted during the fast network re-entry from among the subscriber station basic capability negotiation process, the privacy key management process, the network address acquisition process, the time information acquisition process, and the TFTP process, which are performed in the conventional network re-entry.

42. The system as claimed in claim 41, wherein the fast network re-entry is performed by omitting processes from among the subscriber station basic capability negotiation process, the privacy key management process, the network address acquisition process, the time information acquisition process, and the TFTP process, which are performed in the conventional network re-entry, based on the fourth information, and performing only remaining processes.

43. A system for fast network re-entry in a broadband wireless access communication system, the system comprising:
    a target base station; and
    a mobile station for storing final session information when transitioning into an idle state, transmitting the final session information to the target base station, such that the target base station and an ASA (Authentication and Service Authorization) server store the final session information, when the mobile station detects that handover from a serving base station to the target base station is necessary after the mobile station stores the final session information, transmitting a first message requiring fast network re-entry to the target base station, and performing the fast network re-entry with the target base station, when receiving a second message approving the fast network re-entry from the target base station;

wherein the target base station receives and stores the final session information, authenticates the first message using final session information of the mobile station stored in advance in the target base station, transmits the second message to the mobile station, after authenticating the first message, and performs the fast network re-entry together with the mobile station.

44. The system as claimed in claim 43, wherein the first message comprises:

first information indicating that the network re-entry to be performed is the fast network re-entry; and second information indicating processes that must be omitted during the fast network re-entry from among a plurality of processes performed in a conventional network re-entry.

45. The system as claimed in claim 44, wherein the second message comprises:

third information indicating approval of the fast network re-entry; and fourth information indicating processes that must be omitted during the fast network re-entry from among the plurality of processes performed in the conventional network re-entry.

46. The system as claimed in claim 45, wherein, when the mobile station and the target base station perform the fast network re-entry, processes from among the plurality of processes performed in the conventional network re-entry are omitted based on the fourth information and only remaining processes are performed.

47. The system as claimed in claim 43, wherein the first message is a ranging request message including first information and second information, the first information indicating that the network re-entry to be performed is the fast network re-entry, the second information indicating processes that must be omitted during the fast network re-entry from among a subscriber station basic capability negotiation process, a privacy key management process, a network address acquisition process, a time information acquisition process, and a TFTP (Trivial File Transfer Protocol) process, which are performed in a conventional network re-entry.

48. The system as claimed in claim 47, wherein the second message is a ranging response message including third information and fourth information, the third information indicating approval of the fast network re-entry, the fourth information indicating the processes that must be omitted during the fast network re-entry from among the subscriber station basic capability negotiation process, the privacy key management process, the network address acquisition process, the time information acquisition process, and the TFTP process, which are performed in the conventional network re-entry.

49. The system as claimed in claim 48, wherein, when the mobile station and the target base station perform the fast network re-entry, processes from among the subscriber station basic capability negotiation process, the privacy key management process, the network address acquisition process, the time information acquisition process, and the TFTP process, which are performed in the conventional network re-entry, are omitted based on the fourth information; and only remaining processes are performed.

50. A method for fast network re-entry of a base station in a broadband wireless access communication system, the method comprising the steps of:

transmitting to a mobile station in an active state a deregistration command message to request for transition into an idle state, wherein the deregistration command message includes session information for a fast network re-entry;

receiving a ranging request message from the mobile station to perform the network re-entry after the mobile station transit into the active state;

transmitting to the mobile station a ranging response message that includes the session information represents whether each network re-entry process among network re-entry procedure is omitted or required.

51. The method as claimed in claim 50, wherein the session information in the deregistration command message represents services for the mobile station and operational information to be retained or omitted.

52. The method as claimed in claim 50, wherein the network re-entry procedure includes a subscriber station basic capability negotiation process, a privacy key management process, a network address acquisition process, a time information acquisition process, and a TFTP (Trivial File Transfer Protocol) process, which are performed in a conventional network re-entry.

* * * * *